United States Patent [19]

Bluege

[11] Patent Number: 4,993,824
[45] Date of Patent: Feb. 19, 1991

[54] THERMAL MAPPING COMPENSATED MIRROR AND METHOD OF MAKING THE SAME

[75] Inventor: John Bluege, Lake Park, Fla.

[73] Assignee: United Technologies Corporation, Hartford, Conn.

[21] Appl. No.: 451,695

[22] Filed: Dec. 18, 1989

[51] Int. Cl.$^5$ .......................... G02B 5/10; G02B 7/18; G02B 5/08
[52] U.S. Cl. .................................. 350/641; 350/607; 350/610
[58] Field of Search ................ 350/641, 607, 609–611, 350/320; 372/35, 99

[56] References Cited

U.S. PATENT DOCUMENTS

| | | | |
|---|---|---|---|
| 2,294,940 | 9/1942 | Skolnik | 350/641 |
| 3,609,589 | 9/1971 | Hufnagel | 350/607 |
| 4,253,739 | 3/1981 | Carlson | 350/610 |

FOREIGN PATENT DOCUMENTS 4003 9/1982 Japan .

Primary Examiner—Bruce Y. Arnold
Assistant Examiner—James Phan
Attorney, Agent, or Firm—Peter R. Ruzek

[57] ABSTRACT

A thermal distortion effect compensated mirror includes a mirror substrate having a reflective surface, and a compensating layer on the reflective surface. The compensating layer is of a material that is substantially transparent to a laser beam to be reflected by the mirror, and has such a thickness as to substantially compensate, during the passage of the laser beam therethrough, for the differences in the propagation path lengths of different laser beam regions impinging on and reflected from different portions of the reflective surface that have been displaced to different extents from their original positions by different thermal growths of the respective underlying zones of the substrate owing to different heating of such substrate zones by different energy levels of the associated laser beam regions.

4 Claims, 1 Drawing Sheet

THERMAL MAPPING COMPENSATED MIRROR AND METHOD OF MAKING THE SAME

DESCRIPTION

1. Technical Field

The present invention relates to mirrors in general, and more particularly to mirrors to be used for reflecting high-intensity beams of light, especially laser beams.

2. Background Art

There are already known various constructions of mirrors, among them those intended to be used for reflecting high-intensity laser beams. Especially mirrors that are used in the latter application are subject to various forms of distortion while in use. One of the most prominent causes of such distortions is the so-called thermal mapping, which is an out-of-plane, thermally induced surface deflection the magnitude of which tends to vary linearly with local laser beam intensity.

More particularly, as different regions of the laser beam impinging on a reflective surface of the mirror reach the respective associated portions of the reflective surface, a small part of their energy is absorbed and heats respective zones of the mirror substrate that underlie such reflective surface portions, resulting in thermal growth of such substrate zones and in corresponding displacement of the overlying reflective surface portions out of their original positions. Now, inasmuch as frequently the laser beam has a nonuniform intensity or energy distribution, that is, different ones of the impinging laser beam regions have different intensities or energy levels, the extents of thermal growth of various ones of the substrate zones, and thus the correlated extents of displacement of the associated ones of the reflective surface portions out of their original positions, are also proportionately different. As a consequence, the total path lengths of the respective impinging and corresponding reflected laser beam regions are shortened to different extents during the use of the mirror as compared to their original lengths, depending on the respective displacements of the associated reflective surface portions out of their original positions, with the result that the wavefront of the reflected laser beam is distorted due to the contemporaneous differences between the spatial positions of the partial wavefronts of the reflected beam regions that are reflected from such different reflective surface portions. Of course, such a laser beam wavefront distortion is very disadvantageous because it adversely affects the reflected laser beam quality and propagation characteristics.

Accordingly, it is a general object of the present invention to avoid the disadvantages of the prior art.

More particularly, it is an object of the present invention to provide a mirror for use especially in reflecting high-intensity laser beams, which mirror does not possess the disadvantages of the known mirrors of this kind.

Still another object of the present invention is so to develop the mirror of the type here under consideration as to substantially eliminate the effect of thermal mapping on the quality of the laser beam reflected from the mirror during its use independently of the spatial and temporal laser beam power distribution.

A concomitant object of the present invention is to design the mirror of the above type in such a manner as to be relatively simple in construction, inexpensive to manufacture, easy to use, and yet reliable in operation.

It is yet another object of the present invention to devise a method of manufacturing the mirror of the above type in such a manner as to achieve substantial compensation for thermally induced laser beam region path differences during the use of the mirror.

DISCLOSURE OF THE INVENTION

In keeping with these objects and others which will become apparent hereafter, one feature of the present invention resides in a thermal distortion effect compensated mirror. The mirror includes a mirror substrate having a reflective surface. During the use of the mirror for reflecting a nonuniform intensity laser beam, the substrate undergoes different thermal growths at different zones thereof in proportion to temperature rises of such zones as incoming laser beam regions of different intensities reach respective portions of the reflective surface that are juxtaposed with these zones. This results in different displacements of the reflective surface portions out of their original positions, and in commensurate reflected laser beam wavefront distortion caused by contemporaneous phase shifts between partial wavefronts of reflected laser beam regions that are reflected from different ones of the reflective surface portions. According to the invention, a compensating layer is provided on the reflective surface. The compensating layer is of a material that is substantially transparent to the laser beam and has a refractive index with a predetermined dependence on temperature and a predetermined coefficient of thermal expansion. This layer has an original thickness that is so selected in dependence at least on the thermal expansion coefficient and on the refractive index temperature dependence of the compensating layer material that respective times of propagation of the respective associated incoming and reflected laser beam regions through respective zones of the compensating layer that overlie the different reflective surface portions and the temperatures of which depend on the temperatures of the underlying ones of the different zones of the substrate differ from one another during the use of the mirror to such respective extents that the partial wavefront phase shifts are substantially eliminated by the time the partial wavefronts of the respective reflected laser beam regions leave the compensating layer.

It may be seen from the above that the present invention is based on the recognition of the fact that the impingement especially of a laser beam with nonuniform cross-sectional intensity distribution, coupled with partial absorption of the energy carried by the laser beam upon such impingement, results in differential substrate growth and in commensurate differential reflective surface displacement with attendant proportionate differential path shortening for different laser beam regions. It may further be seen that, to overcome this problem, it is proposed in compensating layer on the reflective surface, this layer having such an original thickness, taking into consideration the thermal expansion of, and the thermally induced reflective index change in, the material of the compensating layer when the respective zones of the compensating layer are heated by the corresponding underlying zones of the substrate, that the effect of the differential path shortening on the contemporaneous locations of the partial wavefronts of the different incoming and reflected laser beam regions is essentially eliminated, regardless of the laser power distribution, by the time the reflected laser beam regions leave the compensating layer.

BRIEF DESCRIPTION OF THE DRAWING

The present invention will be described in more detail below with reference to the accompanying drawing in which.

BEST MODE FOR CARRYING OUT THE INVENTION

Figure 1:
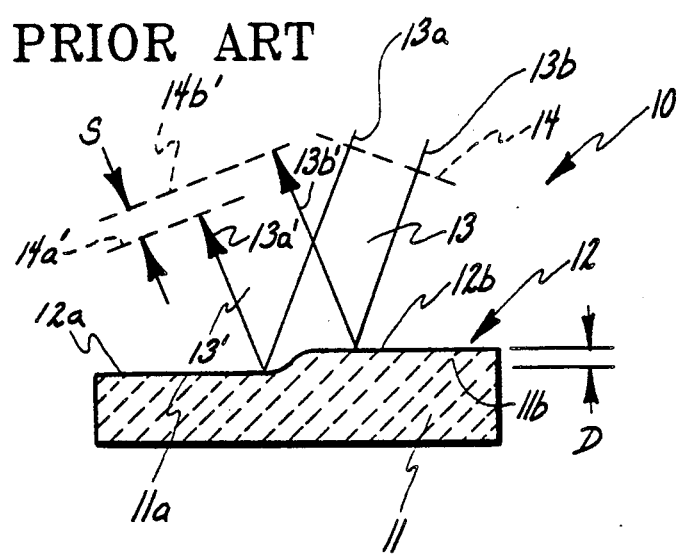
FIG. 1 is a simplified cross-sectional view of a conventional mirror illustrating, in a somewhat exaggerated manner, the effect of differential mirror substrate heating by impinging laser beam on the configuration of the reflecting surface of the mirror and ultimately on the partial wavefronts of selected reflected laser beam regions.

Referring now to the drawing in detail, and first to FIG. 1 thereof, it may be seen that the reference numeral 10 has been used therein to identify a mirror of a conventional type. While the mirror 10 has been illustrated to include only a solid substrate 11, it is to be understood that the mirror 10 may consist, as is well known, of several discrete interconnected components, such as a faceplate and a backing plate which define a cooling chamber or cooling passages between themselves for the flow of a cooling medium therethrough, in which case the faceplate of the mirror 10 constitutes the substrate 11.

The substrate 11 is provided with a reflective surface 12, such as with a reflective coating layer, on one of its major surfaces. During the use of the mirror 10, an incoming laser beam 13, which is represented by two separate incident laser rays 13a and 13b, is directed against the reflective surface 12 and is reflected therefrom as a reflected laser beam 13' that is represented by two reflected laser rays 13a' and 13b'. The respective associated incident and reflected laser rays 13a and 13a', or 13b and 13b' are situated within respective associated incident and reflected laser beam regions. Of course, in reality, there usually are many more than two laser beam regions of different intensities or energy levels in the incoming laser beam 13, but description of two of them and their effect on the mirror 10 will be sufficient inasmuch as any additional ones of such regions affect the mirror 10 in a manner that is akin to that associated with such two laser beam regions.

As is well known, the reflective surface 12 is less than a perfect reflector, that is, it does not reflect all of the incident laser radiation; rather, it lets a predetermined portion of the laser radiation energy penetrate into and thus heat the substrate 11. Such heating of the substrate 11 then results in thermal growth of the material of the substrate 11. This effect has only negligible and easily avoidable consequences when the energy of the laser beam 13 is relatively low and/or when the laser beam intensity distribution over the cross-section of the incident laser beam 13 is uniform. However, when the laser beam 13 carries a relatively high amount of energy, and when its cross-sectional energy distribution is nonuniform, as is the case, for instance, when the incoming laser beam 13 is issued by a high-energy laser (HEL), there is encountered a phenomenon often referred to as thermal mapping distortion of the mirror 13.

To explain this phenomenon, it is assumed in the illustrative example presented in FIG. 1 of the drawing that the incident laser beam region containing the laser ray 13b has a higher intensity or energy level than that containing the laser ray 13a. As a consequence, a zone 11b of the substrate 11 situated underneath a portion 12b of the reflective surface 12 that reflects the incident laser beam region containing the laser ray 13b absorbs more thermal energy and thus undergoes a more extensive thermal growth during the operation of the mirror 10 than a substrate zone 11a underlying a portion 12a of the reflective surface 12 that reflects the incident laser beam region containing the laser ray 13a. This results in a situation where the spatial position of the reflective surface portion 12b is displaced by a distance D relative to that of the reflective surface portion 12a, in the upward direction as considered in the drawing.

This displacement D, in turn, has a deleterious impact on the quality of the reflected laser beam 13' and particularly on the shape of its wavefront. The reason for this reflected laser beam deterioration will become readily apparent from a consideration of the effect of the distorted shape of the reflective surface on a planar wavefront 14 of the incoming laser beam 13. It will be appreciated that, inasmuch as the laser beam regions containing the rays 13a and 13b are reflected from the reflective surface portions 12a and 12b that are spaced by the distance D from each other, respective partial wavefronts of the corresponding reflected laser beam regions containing the reflected rays 13a' and 13b' are contemporaneously spaced from one another by a distance S which is a (linear) function of the distance D. Put differently, there is a phase shift or phase delay between such partial wavefronts. Obviously, this phase shift will distort the shape of the reflected beam wavefront and thus the quality of the reflected laser beam 13'.

Figure 2:
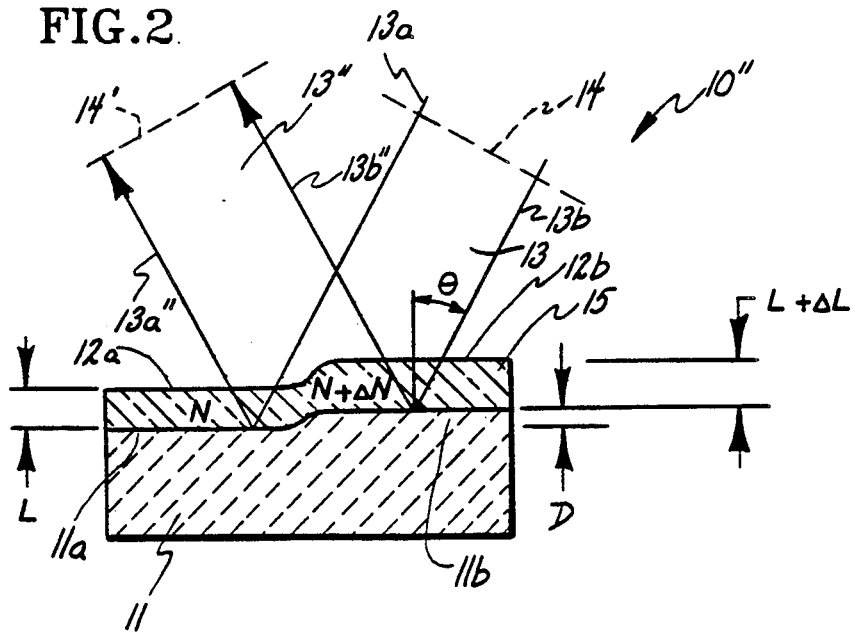
FIG. 2 is a view similar to that of FIG. 1 but illustrating the compensating layer provided on the mirror substrate in accordance with the present invention and the effect of this compensating layer on the partial wavefronts.

This drawback is avoided in accordance with the present invention in that, as indicated in FIG. 2 of the drawing in which the same reference numerals as before but occasionally supplemented with a double prime instead of a single one have been used to identify corresponding parts, a compensating layer or coating 15 is provided on the substrate 11 over the reflective surface 12 of the mirror 10''. The compensating layer 15 is of a material which is transparent to the incoming laser beam 13 (and, by the same token, also to a reflected laser beam 13''), so that the incoming laser beam 13 encounters the reflective surface 12 only after passing through the compensating layer 15 while the reflected laser beam 13'' first passes through the compensating layer 15 before emerging from the latter into the ambient space or atmosphere. As will be explained in more detail below, the compensating layer 15 is tailored to effectuate substantial cancellation of the thermal mapping distortion effect in a manner which is essentially independent of the spatial and temporal power distribution.

In this context, it is to be realized that the mapping distortions reduce the overall optical path length of the beam or, more particularly, separately and to different extents, the path lengths of the individual laser beam regions. To counteract this effect, the compensating layer material properties and the thickness of the compensating layer 15 are chosen to increase the optical path or each of the respective optical paths by a like factor. Obviously, as with a conventional mirror of the type described above, the high intensity region 13b of the beam 13 induces the relatively high temperature zone 11b in the substrate 11, while the lower intensity region 13a of the beam 13 induces the commensurately lower temperature zone 11b in the substrate 11 which, in turn, causes differential thermal expansion of the zones 11a and 11b. This expansion varies essentially linearly with beam intensity, and it can be analytically or experimentally determined with a great accuracy. Consequently, the local reflective surface deflection D(x,y) for any reflective surface portion, such as 11a and 11b, wherein x and y represent the coordinates of the particular reflective surface portion 12 a or 12b in the plane of the reflective surface 12, can be determined from the change in local temperature distribution ΔT(x,y), using an analytically or experimentally determined scale factor K, from the equation $$D(x,y) = K.\Delta T(x,y).$$

It is well known that transparent materials, such as that of the compensating layer 15, are subject to thermally induced changes in both thickness and refractive index. The total optical path variation d'(x,y) of a beam 13 and 13" entering and reflected from the mirror 10" of FIG. 2 that is provided with the transparent compensating layer 15 of the present invention, during its passage through the compensating layer 15 can be shown to be $$d'(x,y) = 2 \cos\theta L.(dN/dT + \alpha N).\Delta T(x,y),$$

wherein θ is the incident angle, L is the thickness of the compensating layer 15, N is the refractive index of the compensating layer material, dN/dT is the temperature dependency of such refractive index, and α is the compensating layer material thermal expansivity and ΔT is the change in temperature from the undeflected condition.

Inasmuch as the two above-mentioned effects (i.e. the thermal growth of the substrate 11 and the changes in the effect the compensating layer 15 has on the light passing therethrough) as linked by the same temperature field, the above equations can be combined to find the precise optimum compensating layer thickness $L_o$ for which the distortions are equal in magnitude but opposite in sign:

$$L_o = D/(2 \cos(e)\Delta T.(dN/dT + \alpha N)),$$

wherein D is the deflection for any arbitrarily selected reflective surface portion and ΔT is the change in temperature of the substrate zone underlying such selected reflective surface portion which induces this deflection. Although these equations assume that the bulk of the external beam path is in air or a vacuum, other external media can be accommodated by replacing the D in the equation with nD, where N is the reflective index of the external medium. It may be seen from the above equation that a single value of Lo will be obtained regardless of which reflective surface portion is selected for the calculation because dN/dT and N are constant for the respective compensating layer material, and so is D/2T in view of the fact that the displacement D generally varies linearly with the temperature change ΔT.

Various optical materials can be used for the compensating layer 15. As an example, the transparent material of the compensating layer 15 may be silicon. Silicon has a dN/dT of 0.00016/° C. an N of 3.4 and α of $2.3 \times 10^{-6}$/° C. The mapping distortion of a typical high performance cooled mirror has been found to be 0.127 μm pv with a local temperature rise of 27° C. An analysis of the above mirror substrate and compensating layer parameters leads to an optimum compensating layer thickness 10 of 14.0 μm of silicon.

A similar analysis of an aluminum oxide compensating layer (with a dN/dT of $12 \times 10^{-6}$/° C., α of $5 \times 10^{-6}$/° C., and N of 1.76) leads to an optimum compensating layer thickness of 113.1 μm of aluminum oxide. The effect of a compensating layer 15 this thin on thermal performance is almost negligible (a surface temperature rise of 3° C.) for a typical high energy laser loading.

Obviously, if so desired, the compensating layer 15 could have a thickness L different from the optimum thickness Lo, and still achieve the beneficial effect of substantially counteracting the effect of the thermal mapping distortion of the mirror substrate 11. The compensating layer can be applied by any number of techniques including material deposition and the bonding of transparent plates.

The compensating layer thickness L can be controlled in any known manner, for instance by controlling the time of deposition of the compensating layer material if the compensating layer is formed by a physical or chemical vapor deposition process. An antireflection coating may be provided on top of the layer 15, or the mirror 10 can be used at the Brewster angle to reduce reflections from the top surface of the compensating layer 15.

While the present invention has been illustrated and described as embodied in a particular construction of a mirror, it will be appreciated that the present invention is not limited to this particular example; rather, the scope of protection of the present invention is to be determined solely from the attached claims.

I claim:

1. A thermal distortion effect compensated mirror comprising a mirror substrate having a reflective surface and undergoing, during the use of the mirror for reflecting a laser beam, different thermal growths at different zones thereof in proportion to temperature rises thereof as incoming laser beam regions of different intensities reach respective portions of said reflective surface that are juxtaposed with said zones, with attendant different displacements of said reflective surface portions out of their original positions, and with commensurate laser beam wavefront distortion caused by contemporaneous phase shifts between partial wavefronts of laser beam regions reflected from different ones of said reflective surface portions; and a compensating layer of a material that is substantially transparent to the laser beam and has a refractive index with a predetermined dependence on temperature and a predetermined coefficient of thermal expansion, on said reflective surface, said compensating layer having an original thickness that is so selected in dependence at least on said thermal expansion coefficient and on said refractive index temperature dependence that respective times of propagation of the respective associated incoming and reflected laser beam regions through respective zones of said compensating layer that overlie said different reflective surface portions and the temperatures of which depend on the temperatures of the underlying ones of said different zones of said substrate differ from one another during the use of the mirror to such respective extents that said partial wavefront phase shifts are substantially eliminated by the time said partial wavefronts of said respective reflected laser beam regions leave said compensating layer.

2. The mirror as defined in claim 1, wherein the optimum value $L_o$ of said thickness is determined from an equation generally of the form $$L_o = D/(2\ cos\theta \Delta T(dN/dT + \alpha N)),$$

wherein $\Delta T$ is the temperature of any selected one of said change in substrate zones;

D is the extent of said displacement of said selected substrate zone due to the temperature change $\Delta T$;

$\alpha$ is said coefficient of thermal expansion of said material of said compensating layer;

N is the refractive index of said material of said compensating layer; and dN/dT is said refractive index temperature dependence of said material of said compensating layer.

3. A method of manufacturing a thermal distortion effect compensated mirror, comprising the steps of providing a mirror substrate having a reflective surface and undergoing, during the use of the mirror for reflecting a laser beam, different thermal growths at different zones thereof in proportion to temperature rises thereof as incoming laser beam regions of different intensities reach respective portions of the reflective surface that are juxtaposed with the different zones, with attendant different displacements of the reflective surface portions out of their original positions, and with commensurate laser beam wavefront distortion caused by contemporaneous phase shifts between partial wavefronts of laser beam regions reflected from different ones of the reflective surface portions;

depositing a compensating layer of a material that is substantially transparent to the laser beam and has a refractive index with a predetermined dependence on temperature and a predetermined coefficient of thermal expansion, on the reflective surface; and controlling said depositing step in dependence at least on the thermal expansion coefficient and on the refractive index temperature dependence in such a manner that the compensating layer obtains such an original thickness that respective times of propagation of the respective associated incoming and reflected laser beam regions through respective zones of the compensating layer that overlie the different reflective surface portions and the temperatures of which depend on the temperatures of the underlying ones of the different zones of the substrate differ from one another during the use of the mirror to such respective extents that the partial wavefront phase shifts are substantially eliminated by the time the partial wavefronts of the respective reflected laser beam regions leave the compensating layer.

4. The method as defined in claim 3, wherein said controlling step includes determining the optimum value $L_o$ of said thickness from an equation generally of the form $$L_o = D/(2\ cos\theta \Delta T(dN/dT + \alpha N)),$$

wherein $\Delta T$ is the temperature change of any selected one of the substrate zones;

D is the extent of the displacement of the selected substrate zone due to temperature change $\Delta T$;

$\alpha$ is the coefficient of thermal expansion of the material of the compensating layer;

N is the refractive index of the material of the compensating layer; and dN/dT is the refractive index temperature dependence of the material of the compensating layer.

* * * * *

UNITED STATES PATENT AND TRADEMARK OFFICE
CERTIFICATE OF CORRECTION

PATENT NO. : 4,993,824

DATED : February 19, 1991

INVENTOR(S) : John A. Bluege

It is certified that error appears in the above-identified patent and that said Letters Patent is hereby corrected as shown below:

Column 2, line 56, after "proposed in", insert --accordance with the present invention to provide a --

Signed and Sealed this

Fourth Day of August, 1992

Attest:

DOUGLAS B. COMER

*Attesting Officer*      *Acting Commissioner of Patents and Trademarks*